W. J. WILLIAMS & J. C. BOWMAN.
FORCE PUMP.
APPLICATION FILED JULY 19, 1909.
1,069,750.
Patented Aug. 12, 1913.
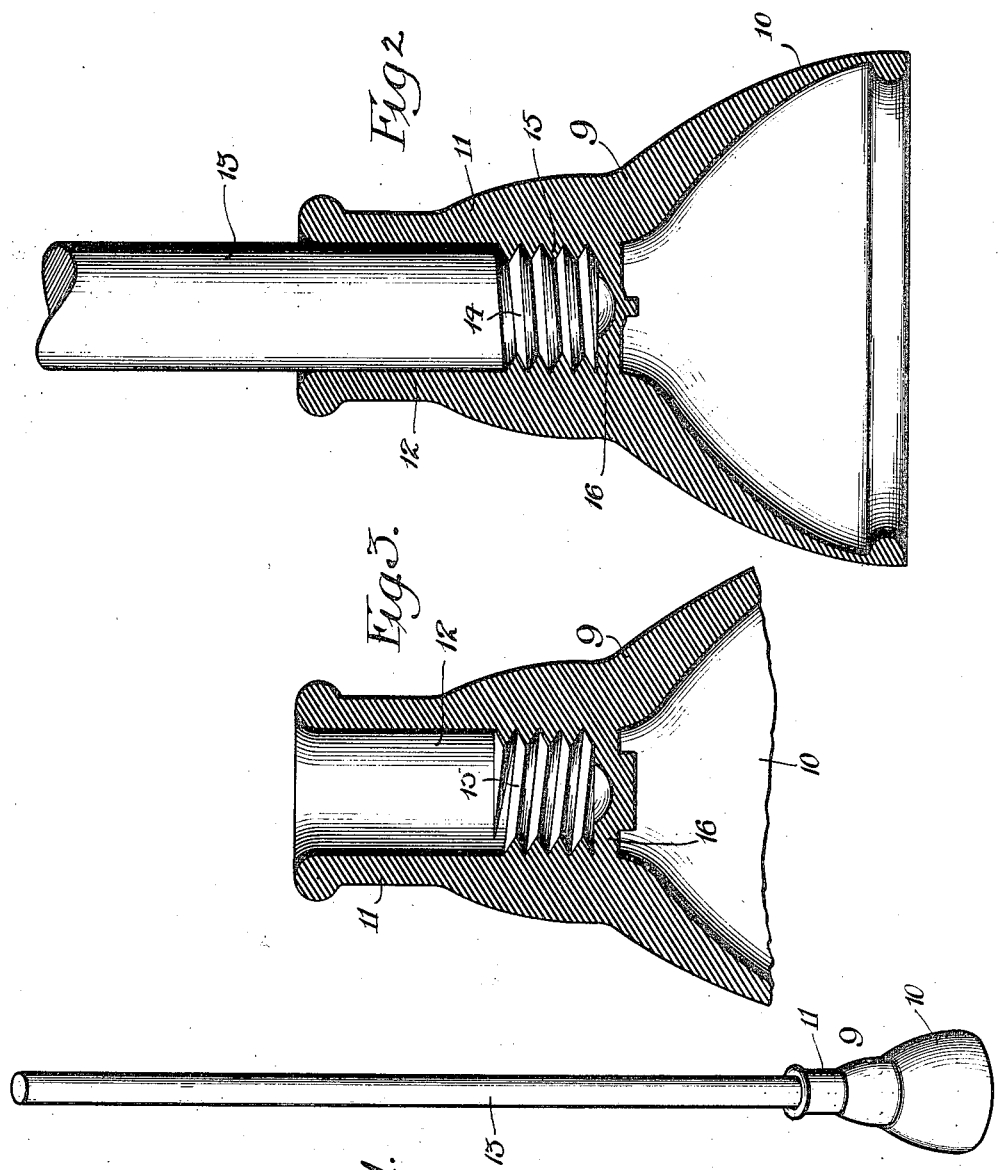

UNITED STATES PATENT OFFICE.

WILLIAM J. WILLIAMS AND JAMES C. BOWMAN, OF CHICAGO, ILLINOIS.

FORCE-PUMP.

1,069,750.

Specification of Letters Patent. Patented Aug. 12, 1913.

Application filed July 19, 1909. Serial No. 508,333.

*To all whom it may concern:*

Be it known that we, WILLIAM J. WILLIAMS and JAMES C. BOWMAN, both residents of Chicago, in the county of Cook and State of Illinois, have invented certain new and useful Improvements in Force-Pumps, of which the following is a full, clear, and exact description.

The invention relates to force pumps and more particularly to means for connecting a cup-shaped plunger of elastic material to an operating handle.

It is now common practice to permanently secure the handle and plunger together by cement or other means and resultantly, if in the operation of the device, the parts should become disconnected, it is difficult to properly connect them.

The invention designs to provide improved means for detachably connecting the handle and the elastic plunger, as well as means which is simple in construction and may be produced at a low cost.

The invention consists in the several novel features hereinafter set forth and more particularly defined by claim at the conclusion hereof.

In the drawings: Figure 1 is a perspective of a pump embodying the invention. Fig. 2 is a section on a larger scale, the handle being shown in elevation and a portion thereof broken away. Fig. 3 is a detail section of the plunger.

The pump comprises a plunger 9, having its lower end 10 cup-shaped as usual in the art. The plunger is formed wholly of elastic material, such as rubber, and has a hollow integral nipple 11, in which a socket 12 is formed to receive the lower end of a handle 13, which is usually formed of wood. The lower end of the handle has a screw-thread 14 cut thereon and at the lower end of the socket 12 a corresponding female screw-thread 15 is formed in the elastic material surrounding the socket. This screw-thread is rather coarse, so that it will not readily break away when subjected to strains. The nipple 11 is thickened adjacent the thread 15 and extends upwardly above the screw-thread to provide an elongated bearing which prevents the thread from being subjected to severe lateral strains if the handle is operated laterally more or less. The lower end of handle 13 abuts against the bottom 16 and when the handle has been inserted in the socket with the screw-thread thereon fitting into the female thread 15, the handle and plunger will be securely connected together. Resultantly, a detachable connection is provided which makes it possible to disconnect the plunger from the handle when desired, and if the plunger becomes worn, as it sometimes does in practice, a new one may be readily substituted. Furthermore, by avoiding the use of cement or the like, the liquid in which the plunger is submerged in use will not effect the connection, the elastic nipple permitting the handle to expand from the action of the liquid.

Having thus described the invention, what we claim as new and desire to secure by Letters Patent, is:

A force pump, comprising a handle having a screw thread at one end, a cup-shaped plunger formed of elastic material, and an integral nipple on said plunger having a screw thread formed in the lower portion of the socket therein to detachably connect the threaded end of the handle thereto, said nipple being extended above said screw threaded portion a distance sufficient to prevent said handle from being pried out of said nipple during use.

WILLIAM J. WILLIAMS.
JAMES C. BOWMAN

Witnesses:
FRED GERLACH,
HILDEW C. PETERSEN.